United States Patent
Hamet et al.

(10) Patent No.: US 12,003,313 B2
(45) Date of Patent: Jun. 4, 2024

(54) CONTROL UNIT, WIRELESS COMMUNICATION NETWORK AND METHOD FOR OPERATING A CONTROL UNIT

(71) Applicant: Fraunhofer-Gesellschaft zur Förderung der angewandten Forschung e.V., Munich (DE)

(72) Inventors: Bastien Hamet, Erlangen (DE); Thomas Kolb, Erlangen (DE); Christian Rohde, Erlangen (DE); Florian Leschka, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 425 days.

(21) Appl. No.: 17/190,799

(22) Filed: Mar. 3, 2021

(65) Prior Publication Data

US 2021/0211188 A1    Jul. 8, 2021

Related U.S. Application Data

(63) Continuation of application No. PCT/EP2019/073583, filed on Sep. 4, 2019.

(30) Foreign Application Priority Data

Sep. 6, 2018   (EP) .................................. 18193020.7

(51) Int. Cl.
*H04W 24/08*       (2009.01)
*H04B 7/0456*      (2017.01)
(Continued)

(52) U.S. Cl.
CPC ....... *H04B 7/18513* (2013.01); *H04B 7/0456* (2013.01); *H04W 24/08* (2013.01); *H04W 72/542* (2023.01)

(58) Field of Classification Search
CPC ... H04W 56/00; H04W 74/08; H04W 74/002; H04W 74/0841; H04W 74/0891; H04W 74/00
(Continued)

(56) References Cited

U.S. PATENT DOCUMENTS 6,072,986 A * 6/2000 Blanchard .......... H04B 7/18532
455/13.3
9,276,665 B1 * 3/2016 Johnson ............... H04B 7/2041
(Continued)

FOREIGN PATENT DOCUMENTS

EP     3158658 A1     6/2018
EP     3158658 B1 *   6/2018     .......... H04B 7/0452
(Continued)

OTHER PUBLICATIONS

B. Hamet et al.: "Over-the-air field trials of linear precoding for multi-spot-beam satellite systems", 34th AIAA International Communications Satellite Systems Conference (ICSSC), Oct. 2016.
(Continued)

*Primary Examiner* — Nathan S Taylor
(74) *Attorney, Agent, or Firm* — Haynes and Boone, LLP

(57) ABSTRACT

A control unit is configured to control a communication between a satellite and a plurality of terminals, wherein the control unit is configured for controlling the communication such that communication is scheduled to a terminal, the communication being one of at least a set-wise first type for a set of terminals and/or a second type. The control unit is configured for determining a joint communication quality for a set of terminals from the plurality of terminals using a joint communication information of the set of terminals. The control unit is configured for determining that the joint communication quality is below a quality threshold value, determining a liable terminal from the set of terminals, the
(Continued)

liable terminal being liable for the joint communication quality being below the quality threshold value, and controlling the communication such that communication of the second type is scheduled to the liable terminal.

22 Claims, 10 Drawing Sheets

(51) Int. Cl.
*H04B 7/185* (2006.01)
*H04W 72/542* (2023.01)

(58) Field of Classification Search
USPC .......................................... 370/32
See application file for complete search history.

(56) References Cited

U.S. PATENT DOCUMENTS

| | | | |
|---|---|---|---|
| 9,386,465 B2* | 7/2016 | Forenza | H04L 1/007 |
| 10,139,820 B2* | 11/2018 | Liu | B64C 39/024 |
| 10,305,580 B1* | 5/2019 | Lee | H04B 7/0626 |
| 10,348,394 B1* | 7/2019 | Bakr | H04L 5/14 |
| 10,483,637 B2* | 11/2019 | Runyon | H01Q 3/08 |
| 2006/0014543 A1* | 1/2006 | Drakos | H04W 16/12 |
| | | | 455/450 |
| 2008/0001812 A1* | 1/2008 | Jalali | H04B 7/2041 |
| | | | 342/354 |
| 2009/0060033 A1* | 3/2009 | Kimmich | H04N 21/2343 |
| | | | 370/465 |
| 2009/0303916 A1* | 12/2009 | Winkler | H04B 7/18515 |
| | | | 370/389 |
| 2010/0120359 A1* | 5/2010 | Agarwal | H04B 7/18539 |
| | | | 455/12.1 |
| 2010/0315949 A1* | 12/2010 | Agarwal | H04B 7/18515 |
| | | | 370/252 |
| 2011/0194655 A1* | 8/2011 | Sampath | H04L 27/0014 |
| | | | 375/344 |
| 2012/0314820 A1* | 12/2012 | Kang | H04L 27/2671 |
| | | | 375/346 |
| 2014/0133435 A1* | 5/2014 | Forenza | H04W 24/02 |
| | | | 370/329 |
| 2016/0211908 A1* | 7/2016 | Noerpel | H04B 7/18506 |
| 2016/0234281 A1* | 8/2016 | Padmanabhan | H04L 67/568 |
| 2017/0085329 A1* | 3/2017 | Ravishankar | H04W 72/0453 |
| 2017/0149493 A1* | 5/2017 | Arapoglou | H04L 25/0224 |
| 2017/0331577 A1* | 11/2017 | Parkvall | H04W 4/00 |
| 2017/0331670 A1* | 11/2017 | Parkvall | H04W 24/10 |
| 2018/0310258 A1* | 10/2018 | Goria | H04W 52/143 |
| 2019/0028185 A1* | 1/2019 | Tomasicchio | H04B 7/0486 |
| 2019/0305842 A1* | 10/2019 | Ginesi | H04B 7/18515 |
| 2021/0152236 A1* | 5/2021 | Ravishankar | H04B 7/18558 |
| 2022/0029697 A1* | 1/2022 | Bakr | H04B 7/0695 |

FOREIGN PATENT DOCUMENTS

| | | | | |
|---|---|---|---|---|
| WO | WO-2011130685 A2 * | 10/2011 | | H04L 1/0003 |
| WO | WO-2014001837 A1 * | 1/2014 | | H04B 7/18515 |
| WO | WO-2020021001 A1 * | 1/2020 | | H04B 7/18578 |

OTHER PUBLICATIONS

A. Guidotti et al.: "Geographical Scheduling for Multicast Precoding in Multi-Beam Satellite Systems", arxiv.org, Cornell University Library, 201 Olin Library Cornell University Ithaca, NY 14853, Apr. 18, 2018 (Apr. 18, 2018), XP080871981.

A. Guidotti et al.: "User Clustering for Multicast Precoding in Multi-Beam Satellite Systems", arxiv.org, Cornell University Library, 201 Olin Library Cornell University Ithaca, NY 14853, Jun. 28, 2017 (Jun. 28, 2017), XP080959137.

D. Christopoulos et al.: "Multicast Multigroup Precoding and User Scheduling for Frame-Based Satellite Communications", IEEE Transactions on Wireless Communications, IEEE Service Center, Piscataway, NJ, US, vol. 14, No. 9, Sep. 1, 2015 (Sep. 1, 2015), pp. 4695-4707, XP011668606.

* cited by examiner

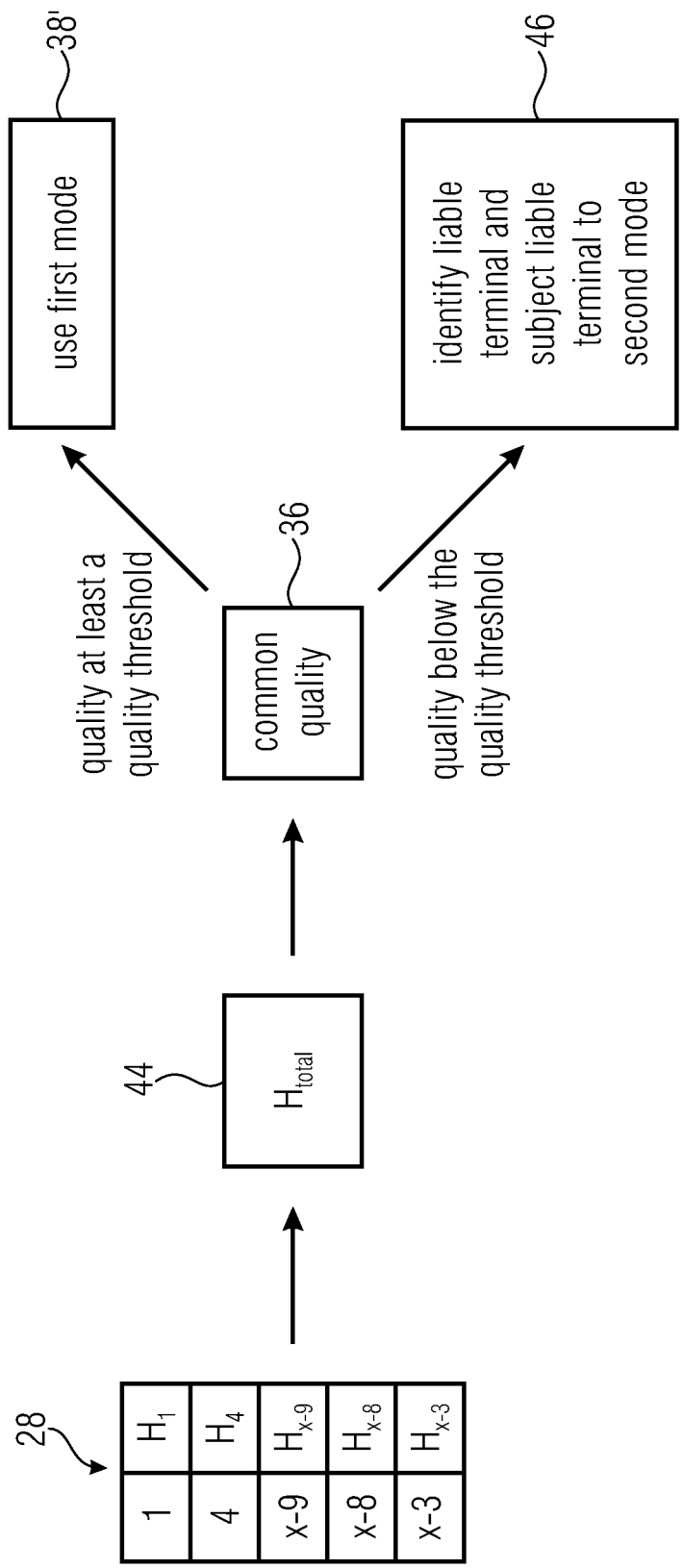

CONTROL UNIT, WIRELESS COMMUNICATION NETWORK AND METHOD FOR OPERATING A CONTROL UNIT

CROSS-REFERENCE TO RELATED APPLICATIONS

This application is a continuation of copending International Application No. PCT/EP2019/073583, filed Sep. 4, 2019, which is incorporated herein by reference in its entirety, and additionally claims priority from European Application No. 18193020.7, filed Sep. 6, 2018, which is also incorporated herein by reference in its entirety.

The present invention refers to a gateway, a wireless communication network and to a method for operating a gateway. The present invention further relates to a user scheduling for precoding in multi-beam satellite systems.

BACKGROUND OF THE INVENTION

Satellites illuminate earth in beams which are designed (in view of location, shape, size, . . . ) by the satellite equipment, e.g., by a beam forming network thereof, the beam forming network controllable by the satellite operator. The beams are designed to trade-off between an efficient use of power and coverage area. The beams do not have a well-delimited boundary and part of the energy spills over to the neighboring beams. This creates interference that can be controlled and used beneficially using techniques like MIMO (multiple input multiple output) as described in [1]. Such technologies require the information about the channel at the user's location.

Precoding techniques for satellite systems as such have not been yet implemented but research is pushing into this direction and has proved its viability, see [1], [2]. Once the first system will be setup with precoding, the first problem of how to schedule the users will appear. The systems have to be able to optimize the system throughput based on the channel information.

Thus, there is a need for a gateway for controlling a satellite, a wireless communication network and a method for operating a gateway allowing for a high system throughput.

SUMMARY

An embodiment may have a control unit configured to control a communication between a satellite and a plurality of terminals, such that communication is scheduled to a terminal, the communication being one of at least a set-wise first type having a common pre-coding for a set of terminals and/or a second type, wherein the control unit is configured for: determining a joint communication quality for a set of terminals from the plurality of terminals using a joint communication information of the set of terminals; determining that the joint communication quality is below a quality threshold value; determining a liable terminal from the set of terminals, the liable terminal being liable for the joint communication quality being below the quality threshold value; and controlling the communication such that communication of the second type is scheduled to the liable terminal.

Another embodiment may have a control unit configured to control a communication between a satellite and a plurality of terminals, wherein the control unit is configured for controlling the communication such that a set-wise communication having a common pre-coding is scheduled for a set of terminals, wherein the control unit is configured for: obtaining information indicating a plurality of sets of terminals, each set of terminals being a subset of the plurality of terminals; associating a joint communication quality to each set of terminals; determining a highest communication quality from the associated joint communication qualities and control the communication such that the set of terminals is scheduled with the communication to which the highest communication quality is associated.

According to another embodiment, a satellite may have a control unit configured to control a communication between a satellite and a plurality of terminals, such that communication is scheduled to a terminal, the communication being one of at least a set-wise first type having a common pre-coding for a set of terminals and/or a second type, wherein the control unit is configured for: determining a joint communication quality for a set of terminals from the plurality of terminals using a joint communication information of the set of terminals; determining that the joint communication quality is below a quality threshold value; determining a liable terminal from the set of terminals, the liable terminal being liable for the joint communication quality being below the quality threshold value; and controlling the communication such that communication of the second type is scheduled to the liable terminal; and a control unit configured to control a communication between a satellite and a plurality of terminals, wherein the control unit is configured for controlling the communication such that a set-wise communication having a common pre-coding is scheduled for a set of terminals, wherein the control unit is configured for: obtaining information indicating a plurality of sets of terminals, each set of terminals being a subset of the plurality of terminals; associating a joint communication quality to each set of terminals; determining a highest communication quality from the associated joint communication qualities and control the communication such that the set of terminals is scheduled with the communication to which the highest communication quality is associated.

According to another embodiment, a gateway may have a control unit configured to control a communication between a satellite and a plurality of terminals, such that communication is scheduled to a terminal, the communication being one of at least a set-wise first type having a common pre-coding for a set of terminals and/or a second type, wherein the control unit is configured for: determining a joint communication quality for a set of terminals from the plurality of terminals using a joint communication information of the set of terminals; determining that the joint communication quality is below a quality threshold value; determining a liable terminal from the set of terminals, the liable terminal being liable for the joint communication quality being below the quality threshold value; and controlling the communication such that communication of the second type is scheduled to the liable terminal; and a control unit configured to control a communication between a satellite and a plurality of terminals, wherein the control unit is configured for controlling the communication such that a set-wise communication having a common pre-coding is scheduled for a set of terminals, wherein the control unit is configured for: obtaining information indicating a plurality of sets of terminals, each set of terminals being a subset of the plurality of terminals; associating a joint communication quality to each set of terminals; determining a highest communication quality from the associated joint communication qualities and control the communication such that the set of terminals is scheduled with the communication to which the highest communication quality is associated.

According to another embodiment, a wireless communication network may have a plurality of terminals; a control unit configured to control a communication between a satellite and a plurality of terminals, such that communication is scheduled to a terminal, the communication being one of at least a set-wise first type having a common pre-coding for a set of terminals and/or a second type, wherein the control unit is configured for: determining a joint communication quality for a set of terminals from the plurality of terminals using a joint communication information of the set of terminals; determining that the joint communication quality is below a quality threshold value; determining a liable terminal from the set of terminals, the liable terminal being liable for the joint communication quality being below the quality threshold value; and controlling the communication such that communication of the second type is scheduled to the liable terminal; a control unit configured to control a communication between a satellite and a plurality of terminals, wherein the control unit is configured for controlling the communication such that a set-wise communication having a common pre-coding is scheduled for a set of terminals, wherein the control unit is configured for: obtaining information indicating a plurality of sets of terminals, each set of terminals being a subset of the plurality of terminals; associating a joint communication quality to each set of terminals; determining a highest communication quality from the associated joint communication qualities and control the communication such that the set of terminals is scheduled with the communication to which the highest communication quality is associated; and at least one satellite operated by a gateway.

According to another embodiment, a method for operating a control unit configured to control a communication between a satellite and a plurality of terminals, wherein the control unit is configured for controlling the communication such that communication is scheduled to a terminal, the communication being one of at least a set-wise first type having a common pre-coding for a set of terminals and/or a second type, may have the steps of: determining a joint communication quality for a set of terminals from the plurality of terminals using a joint communication information of the set of terminals; determining that the joint communication quality is below a quality threshold value; determining a liable terminal from the set of terminals, the liable terminal being liable for the joint communication quality being below the quality threshold value; and controlling the satellite so as to schedule communication of the second type to the liable terminal.

According to another embodiment, a method for operating a control unit configured to control a communication between a satellite and a plurality of terminals, wherein the control unit is configured for controlling the communication such that a set-wise communication is scheduled for a set of terminals, may have the steps of: obtaining information indicating a plurality of sets of terminals, each set of terminals being a subset of the plurality of terminals; associating a joint communication quality for each set of terminals; and determining a highest communication quality from the associated joint communication qualities and control the communication such that the set of terminals is scheduled with the set-wise communication to which the highest communication quality is associated.

Another embodiment may have a non-transitory digital storage medium having a computer program stored thereon to perform any of the inventive methods when said computer program is run by a computer.

A recognition of the present invention is that by feeding groups of terminals commonly, a beam of a satellite may be used commonly for the group of terminals. At the same time, single terminals of a group of terminals may be incompatible in view of the communication mode used with the beam and may thus prevent feeding the group commonly. As the set of terminals is re-formed afterwards, it is also possible that the system tries to include the incompatible terminal in a new group, thus preventing the new group of being scheduled with communication. Embodiments thus exclude the incompatible terminal being liable for the group of terminals being regarded as erroneous and to schedule the liable terminal with a different kind of communication. Thereby, time delays caused for an overall communication by a liable terminal may be low and the overall system throughput may be high.

According to an embodiment, a control unit is configured to control a communication between a satellite and a plurality of terminals. The control unit is configured for controlling the communication such that communication is scheduled to a terminal, the communication being one of at least a set-wise first type for a set of terminals and/or a second type. The control unit is configured for determining a joint communication quality for a set of terminals from the plurality of terminals using a joint communication information of the set of terminals, for determining that the joint communication quality is below a quality threshold value, for determining a liable terminal from the set of terminals, the liable terminal being liable for the joint communication quality being below the quality threshold value. The control unit is further configured for controlling the communication such that communication of the second type is scheduled to the liable terminal. This allows to exclude the liable terminal from further consideration which is deemed to cause a low quality of transmission, i.e. more residual interference at the receivers and/or a suboptimal network setting, e.g., because due to the deemed low quality more robust transmission parameters would be chosen, e.g. a lower coderate. In case of transmission errors, retransmissions will be requested thereby causing a low throughput. Those effects may lead to a third effect being an increased transmission delay and/or reduced throughput.

According to an embodiment, the set is a proposal indicating that the communication of the first type is proposed to be scheduled jointly, i.e., commonly to the set of terminals. By treating terminals set-wise it may be exploited that in satellite-communication, differences in channels are usually low over large distances because each terminal may be deemed so as to face the same or a comparable channel, e.g., a line of sight path.

According to an embodiment, the set may be received from a pre-scheduler configured for generating the set of terminals as a subset of the plurality of terminals using a combination criterion or by random. This may allow providing the control unit with respective sets of terminals, wherein the combination criterion may allow for forming such sets of terminals that are deemed to fit together well.

According to an embodiment, for determining the liable terminal, the control unit is configured for determining a communication quality parameter based on the joint communication quality and associating the communication quality parameter with each of the terminals of the set of terminals, for which the base station determines that the joint communication quality is below the quality threshold value. Alternatively, or in addition, the control unit may be configured for evaluating the communication quality parameter of each of the terminals of the set of terminals with respect to a communication quality parameter threshold and to determine a terminal as liable terminal when the communication quality parameter is larger than or equal to the communication quality parameter threshold. For example, the communication quality parameter may be a counter indicating a number of iterations during which the terminal was part of a set that was being rejected from being processed together. When a counter of a single terminal exceeds the communication quality parameter threshold, the terminal may be considered as liable terminal. Thereby, monitoring of terminals may be implemented using a low computational effort and low amounts of memory.

According to an embodiment, the communication quality parameter associated to a terminal is a counter. The control unit is configured for incrementing or decrementing the counter each time the terminal is part of a set for which the control unit determines that the joint communication quality is below the quality threshold value. The control unit is further configured for determining the terminal as liable terminal when the counter has reached a predefined value. This allows for a simple and fast processing.

According to an embodiment, the control unit is configured for iteratively determining the joint communication quality for different sets of terminals in different iterations. The control unit is configured for associating the terminal quality parameter to the terminal by reading, from a memory prior channel quality parameter already associated with the terminal and for combining the prior channel quality parameter with the determined channel quality parameter determined in the present iteration so as to obtain an updated channel quality parameter and to associate the updated channel quality parameter with the terminal by storing the updated channel quality parameter in the memory. The control unit is configured for determining the liable terminal using the updated channel quality parameter. The control unit may be configured for performing such actions in each iteration. This may allow excluding a liable terminal as soon as its channel leads to an exceedance of the threshold value.

According to an embodiment, the joint communication information is a channel matrix formed for the set of terminals, i.e., a common channel matrix. This allows for a low computational effort as channel matrices are also determined for other purposes.

According to an embodiment, the joint communication quality is a condition number of the channel matrix. This allows for an efficient evaluation of the joint communication quality because the condition number may easily be determined and may further easily be evaluated.

According to an embodiment, the control unit is configured for rejecting the set of terminals from being scheduled with the communication of the first type when the joint communication quality is below a quality threshold value and to exclude the liable terminal from the set of terminals. The control unit comprises a pre-scheduler configured for including the remaining terminals into at least one further set of terminals and to provide the further set of terminals as further proposal. I.e., the remaining terminals are included into different sets of terminals. This allows for scheduling communication to rejected terminals and thereby for a low latency.

According to an embodiment, the control unit is configured for controlling the satellite so as to schedule the set of terminals for a jointly precoded communication in the first mode and to schedule the liable terminal to an un-precoded communication. This allows using a precoding in case the joint communication quality is at least the threshold value, wherein, for a case in which the liable terminal may not be precoded adequately, a different, un-precoded communication is scheduled.

According to an embodiment, the control unit is configured for forming the set of terminals based on a channel state information of a channel between the satellite and a terminal of the set of terminals, wherein the control unit is configured for approximating the channel state information based on a location-related information being related to a position of the terminal. This allows to reduce or avoid transmission of channel state information between the terminal and the gateway and thus to reduce the load for such information, in particular in view of the location information requiring a low amount of bandwidth.

According to an embodiment, a control unit is provided, the control unit configured to control a communication between a satellite and a plurality of terminals, wherein the control unit is configured for controlling the communication such that a set-wise communication is scheduled for a set of terminals. The control unit is configured for obtaining information indicating a plurality of sets of terminals, each set of terminals being a subset of the plurality of terminals; for associating a joint communication quality to each set of terminals; and for determining a highest channel quality from the associated common channel qualities and control the communication such that the set of terminals is scheduled with the communication to which the highest channel quality is associated.

According to an embodiment, the control unit is configured for: determining that the joint communication quality of a set is below a quality threshold value; for determining a liable terminal from the determined set of terminals, the liable terminal being liable for the joint communication quality being below the quality threshold value; and for controlling the communication such that communication of a different type is scheduled to the liable terminal.

According to an embodiment, the control unit is located at least partially as part of the satellite and/or at least partially as part of the gateway.

According to an embodiment, a satellite comprises an embodied control unit.

According to an embodiment, a gateway comprises an embodied control unit.

According to an embodiment, a wireless communication network comprises a plurality of terminals, a control unit and at least one satellite operated by a gateway.

According to an embodiment, a method for operating a control unit configured to control a communication between a satellite and a plurality of terminals, wherein the control unit is configured for controlling the communication such that communication is scheduled to a terminal, the communication being of at least a set-wise first type for a set of terminals and/or of a second type, comprises to determine a joint communication quality for a set of terminals from the plurality of terminals using a joint communication information of the set of terminals, determining that the joint communication quality is below a quality threshold value, determining a liable terminal from the set of terminals, the liable terminal being liable for the joint communication quality being below the quality threshold value, and controlling the satellite so as to schedule communication of the second type to the liable terminal.

According to an embodiment, a method for operating a control unit configured to control a communication between a satellite and a plurality of terminals is provided. The control unit is configured for controlling the communication such that a set-wise communication is scheduled for a set of terminals. The method comprises obtaining information indicating a plurality of sets of terminals, each set of terminals being a subset of the plurality of terminals; associating a joint communication quality for each set of terminals; and determining a highest communication quality from the associated common communication qualities and control the satellite so as to schedule the set of terminals with the communication of the first type to which the highest communication quality is associated.

According to an embodiment, a non-transitory storage medium has stored thereon a computer program having a program code for performing such a method.

BRIEF DESCRIPTION OF THE DRAWINGS

Embodiments of the present invention will be detailed subsequently referring to the appended drawings, in which:

FIG. 3a shows a schematic block diagram of example actions that may be performed by the gateway of the wireless network of FIG. 1 according to an embodiment so as to allow for a high system throughput;

DETAILED DESCRIPTION OF THE INVENTION

Figure 1:
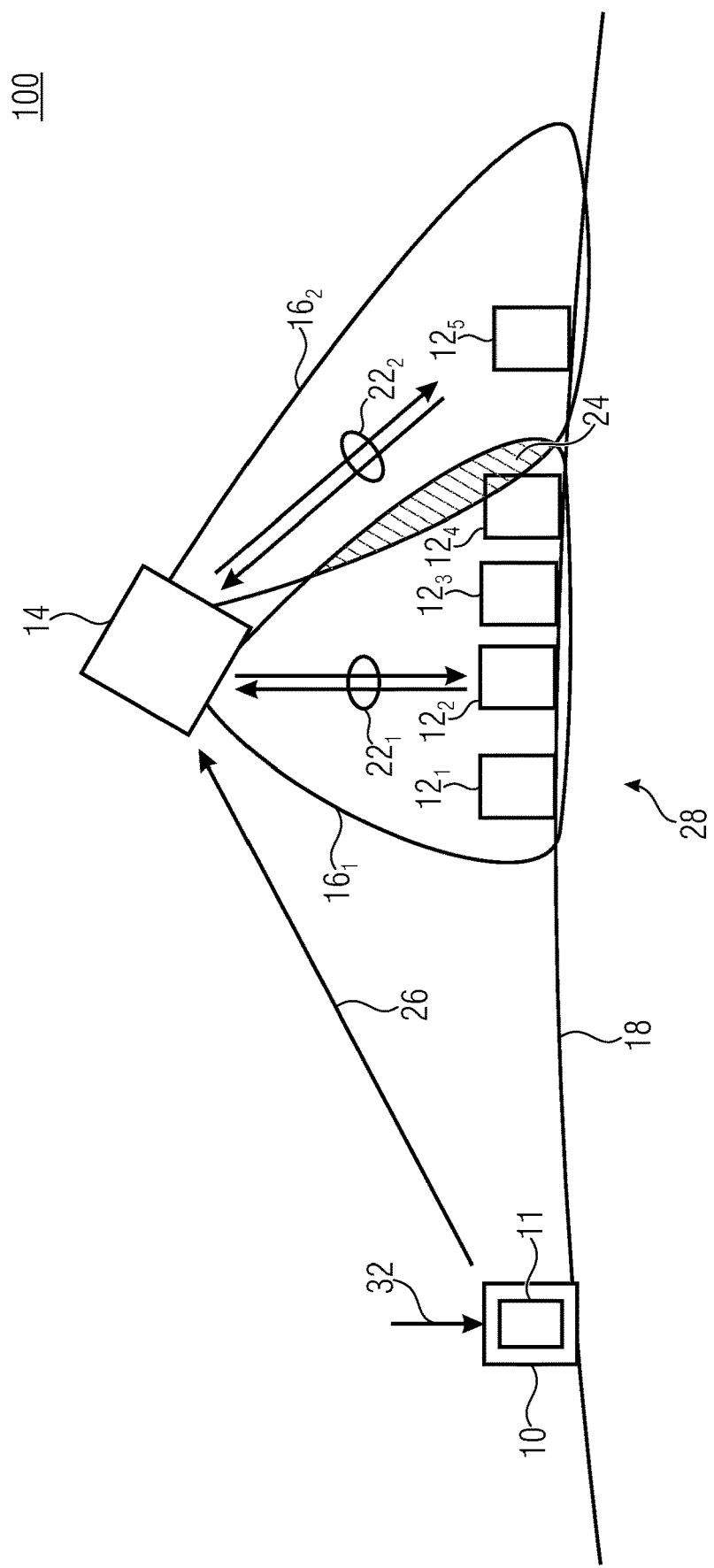
FIG. 1 shows a schematic block diagram of a wireless communication network according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In the following, reference is made to a gateway for controlling a satellite. Such a control may include instructions for the satellite on how to form and/or use beams formed with the satellite so as to illuminate earth and so as to schedule communication to terminals illuminated by such beams. Amongst other things, the satellite may be configured for implementing a multiple input multiple output (MIMO) communication. Such a communication may be bi-directional between the terminal and the satellite, wherein, accordingly, the satellite may bi-directionally communicate with a further terminal or the gateway.

Although the gateway is described so as to be located on earth, a respective controller/gateway so as to control the satellite may alternatively be arranged anywhere else, e.g., airborne, spaceborne (e.g., part of the satellite or a different satellite), on a ship or below the surface.

Embodiments described herein relate to precoding. Precoding performed in the described embodiments includes, amongst other things like beamforming, beam control and using advantages of interference, a pre-equalization of the interfering channel already at the transmitter/gateway side.

Embodiments described herein further relate to communication quality and to evaluation of communication quality. For evaluating a communication quality, a quality measure may be used as well as a quality badness measure. Embodiments allow for a high overall communication quality which is equivalent to a low overall communication badness. The quality may be evaluated differently, wherein a high communication quality means a low communication badness related to a high number of retransmissions, a high level of interference or the like. It is further equivalent to associate a high communication quality with a high communication quality score and with a low communication badness score. When evaluating communication quality for being sufficiently good or too bad, it is further equivalent to decide whether a predetermined quality threshold has been reached and/or if the score is higher and to decide whether a predetermined badness threshold has not been reached and/or if the score is higher and vice versa.

FIG. 1 shows a schematic block diagram of a wireless communication network 100 according to an embodiment. The network 100 comprises at least one gateway 10 according to an embodiment, gateway 10 having a control unit according to an embodiment, the wireless communication network 100 further comprising and one or more terminals $12_1$ and/or $12_2$. Each of the terminals $12_1$ and/or $12_2$ of the wireless communication network 100 may be a respective end-node such as a user terminal, a reference node for evaluating links at respective locations, i.e., reference-terminals and/or may be a distributor for further distributing communication such as a base station or the like. Different terminals of the wireless communication network 100 may be equal or different.

The wireless communication network 100 further comprises a satellite 14 that may be arranged, for example, in a geo-stationary orbit, a lower-earth orbit, a medium-earth orbit or a different orbit.

Although embodiments are described as the gateway 10 and the satellite 14 being separate entities, e.g., the satellite operating as a relay, embodiments also relate to the gateway 10 being at least partially or even completely implemented in the satellite 14, e.g., when the satellite 14 comprises a respective processing unit.

The control unit 11 described herein may be arranged at the gateway 10 and/or as part thereof or next to the gateway 10. Embodiments of the present invention are nevertheless not limited hereto as the control unit 11 may be arranged or implemented only partially in or at the gateway 10 or may even be arranged at a different location, i.e., partially or completely anywhere in the network, e.g., at least partially as a part of the satellite.

The satellite 14 may be adapted so as to form one or more communication beams $16_1$ and/or $16_2$. Each of the communication beams $16_1$ and/or $16_2$ may be switched on or off by the satellite 14 or may, alternatively or in addition, be adapted by the satellite 14. Although two communication beams $16_1$ and $16_2$ are illustrated, a different number of communication beams may be formed with the satellite 14, for example, a number greater than 2, a number greater than 5, greater than 10 or even greater than 100. Each of the communication beams $16_1$ and $16_2$ may be adapted so as to cover a part of earth's surface 18 so as to allow a bi-directional communication $22_1$, $22_2$ respectively between the satellite 14 and terminals $12_1$ to $12_4$, $12_5$ respectively illuminated by the respective communication beam. For example, the control unit 11 may configure the satellite 14 and/or control the communication by scheduling communication to the terminals $12_1$ to $12_4$. This may comprise providing resources for uplink and/or downlink, e.g., by a dedicated scheduling process and/or by a random access procedure. The control unit 11 may control communication such that a downlink communication, e.g., a signal transmitted from the satellite 14 to earth using the communication beam $16_1$ is received by the terminals $12_1$ to $12_4$, i.e., the terminals are illuminated by the communication beam $16_1$. Such downlink communication may include different signals for different terminals $12_1$ to $12_4$ and/or common signals for two or more terminals $12_1$ to $12_4$, but may also include instructions to the terminals $12_1$ to $12_4$ when to use uplink communication towards the satellite 14.

Adjacent communication beams $16_1$ and $16_2$ may overlap in an overlap region 24, causing interference.

The control unit may itself or may cause the gateway 10 to transmit a control signal 26 to the satellite 14 so as to control the satellite 14 and/or communication. Embodiments cover both, instructions to the satellite so as to use the satellite 14 as relay and providing the satellite 14 with the necessary information such that the satellite 14 may determine its operation on its own, i.e., the gateway 10 and/or the control unit 11 may be a part of the satellite. Optionally, the gateway 10 or control unit 11 may act as a communication partner of the satellite 14 and may also receive signals from the satellite 14 so as to implement a bi-directional communication. For example, the satellite 14 may also direct one or more beams towards the control unit 11.

The control unit 11 is configured for controlling the communication, e.g., by controlling the gateway 10 and/or the satellite 14 so as to schedule communication to one or more of the terminals $12_1$ to $12_5$. The communication may be at least of a first type and a second type.

Communication of the first type may be adapted set-wise for a group of terminals, for example, the terminals $12_1$ to $12_4$. Communication of the second type may also be adapted group-wise but may also be adapted individually. For example, communication of the first type may refer to a set-wise and thus common precoding, i.e., a joint precoding. Communication performed by use of a satellite may allow for a high number of terminals that are located within a limited distance between each other and that may have common channel/communication characteristics such as a line-of-sight (LoS) path. Channels between different terminals and the satellite may thus be similar, allowing a similar error correction, precoding or equalization of the channels.

The control unit 11 may receive information indicating a set 28 of terminals, the information indicating that a common or joint communication according to the first mode may possibly be scheduled to the set 28 of terminals. The control unit 11 may then check or evaluate if such a common communication schedule may be suitable. For example, the first mode may be a precoded communication.

The control unit 11 may be configured for determining a joint communication quality, i.e., a communication quality is determined commonly, jointly or collectively for the set 28 of terminals, for their respective channels in common. For determining such a joint communication quality, the control unit 11 may use a joint, collective or common channel/communication information, the joint communication information valid for the set 28 of terminals. The joint communication information may be, for example, a channel matrix containing information about the channels of each terminal $12_1$ to $12_4$ of the set 28. Alternatively or in addition, information such as signal-to-noise-power ratio or signal-to-noise-plus-interference-power ratio of each terminal or of the set of terminals. A channel state information (CSI) or a different information quantifying the channel quality or communication quality may be used. The Channel State Information may describe the basic properties such as amplitude and/or phase of each channel in the MIMO system between terminals and satellite beams, such that there is at least one CSI per terminal. The channel matrix may be a subset or a combination of the individual CSI values and may contain, e.g., one CSI value per beam. Such a joint channel/communication information may be provided, for example, by an entity providing the information indicating the set 28. Alternatively, the gateway 10 and/or the control unit 11 may be configured for determining the joint communication information. For example, communication information indicating a channel state of each of the terminals $12_1$ to $12_5$ may be reported by the respective terminal and may be stored in a common database to which the control unit 11 has access. The control unit 11 receiving information 32 indicating the set 28 may thus be enabled to determine the joint communication information.

For example, the joint communication information is a channel matrix containing each channel of the set 28. For example, the joint communication quality may be a condition number or a different measure determined from the channel matrix, i.e., the joint communication information. The condition number is a function with respect to an argument measure how much the output value of the function can change for a small change in the input argument. By way of non-limiting example only, the condition number κ of the channel matrix H may be written as $\kappa(H) = \|H\| \|H^{-1}\|$, wherein based on the properties the channel matrix H has, different ways for determining the condition number are known. The condition number may increase for a reduced overall or joint channel/communication quality, i.e., may increase for a decrease in the joint communication quality. Other scores for the joint communication quality may be used alternatively or in addition, allowing for evaluating if the joint communication quality is good enough for common precoding or not. Good enough may relate to system requirements and may be set differently for different networks and/or satellites and/or beams.

By way of example, the condition number of channel matrix H is used. Based on the respective channels contained in the matrix, a value of the condition number may vary between small values, e.g., 1 and high values, e.g., 10,000 or the like. The variation may be linear or non-linear. To allow a simple evaluation, a post-processing of the joint communication quality score may be implemented such as a logarithm or a square-root. For example, a determination rule may be based on:

$$-\log(\text{cond}(H))$$

wherein log relates to the logarithm of any suitable base such as 2 or 10, cond(H) is the condition number of matrix H being the joint communication quality information. By use of the inversion of the sign, the channel badness score condition number may be converted to a channel quality (goodness) score.

I.e., a measure for bad channel quality may be indicated by the channel matrix condition as higher values mean worse channel quality. A criterion to identify a bad channel condition (measure above a threshold) may thus be used, e.g., a measure which may lead to bad common communication quality (like a low SNR value) as an equivalent for a measure for a good channel.

The control unit 11 may be configured for determining that the joint communication quality is below a quality threshold value, wherein the quality threshold value may be set, for example, so as to allow a sufficient communication of all nodes. The quality being below the threshold value may be determined by determining a quality score as being too low and/or by evaluating a badness score such as the condition number as being too large. For example, the quality threshold may be set so as to exclude the worst 5%, 10% or 20% of the communication. For example, the control unit 11 may compare the condition number with the quality threshold value. In case the condition number is equal to or larger than the quality threshold, the joint communication quality may be determined so as to be below the quality threshold value. Based thereon, the control unit 11 may drop the set 28, i.e., the control unit 11 may perform a different action when compared to instructing the satellite 14 so as to commonly precode the set 28 of terminals.

In particular, the control unit 11 may be configured for determining a liable terminal from the set of terminals, the liable terminal being liable for the joint communication quality being below the quality threshold value. Because of considering the set 28 as a whole, it is possible and possibly likely that a single terminal or a few terminals from the set 28 is liable for the set 28 being refused as a whole. For example, the single terminal or the few terminals may each comprise a communication quality being considered as bad whilst the remaining terminals have a sufficient or even good channel quality.

Based thereon, the control unit 11 is configured for controlling the satellite so as to schedule communication of the second type to the liable terminal. Controlling the satellite so as to schedule a communication of the second type to the liable terminal may comprise, for example, using a different, possibly individual precoding for the terminal or a set of terminals being considered as liable. Alternatively, the control unit 11 may be configured for controlling the satellite 14 so as to schedule un-precoded communication to at least the liable terminal. Thus, the control unit 11 is configured for controlling the satellite 14 so as to handle the liable terminal differently when compared to the terminals having a sufficiently good quality.

The non-liable terminals may be grouped into new sets, the new sets being scheduled commonly, indicating groups of terminals that may have a sufficiently good joint communication quality. As the liable terminal is scheduled differently, it may be excluded from forming the new sets. It is thereby prevented that the liable terminal is grouped into a new set which is likely to be refused again. Thereby, it may be prevented that the liable terminal disturbs a scheduling permanently. Also, a maximum waiting time can be guaranteed until a terminal is scheduled for communication either in the first type or in the second type communication.

Figure 2:
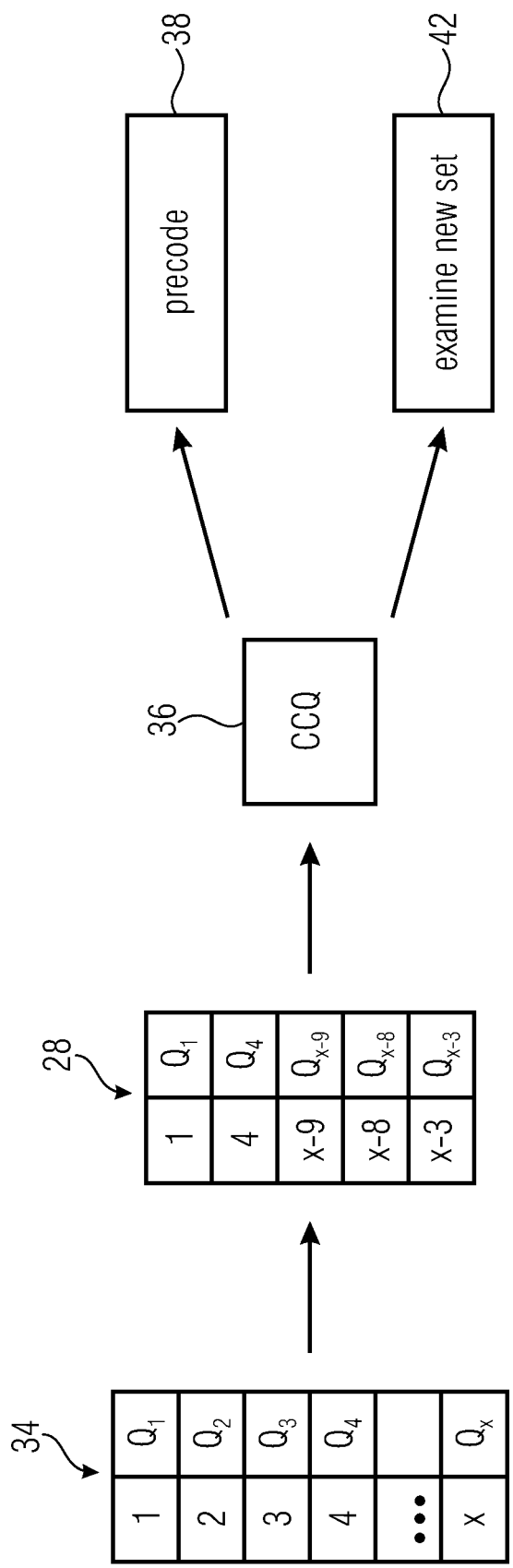
FIG. 2 shows a schematic block diagram illustrating example actions performed at least partially by a gateway of the wireless communication network of FIG. 1 according to an embodiment.

FIG. 2 shows a schematic block diagram illustrating the actions performed at least partially by the control unit 11. A plurality 34 of terminals, e.g., the terminals $12_1$ to $12_5$, i.e., all terminals being in range of communication with the satellite 14 may each comprise an individual communication quality $Q_1$ to $Q_x$. From the plurality 34 of terminals, the set 28 may be derived, for example, as subset of the plurality 34. For example, the plurality 34 may comprise more than 10, more than 20, more than 50, more than 100 or even more than 1000 terminals. The set 28 being a subset thereof may comprise, for example, at least 2 and at most 50, at least 3 and at most 40 or at least 5 and at most 10 terminals, wherein any other number may be implemented. These considerations may depend on or at least be influenced by the level of interference among different beams. If the signal of one beam is visible only in the neighboring beam, a low set size can be implemented. However, if the signal of one beam spills over to several or a lot of other beams, a greater set size can be chosen. The terminals of the set 28 may still comprise an individual channel quality $Q_i$ with i being the index of the respective terminal.

The control unit 11 may be configured for determining a joint communication quality 36, for example, the condition number of a channel matrix being formed from the individual channel qualities. For example, each of the channel qualities $Q_i$ may be represented as an individual channel matrix such that the plurality of channel matrices being obtained by the individual channel qualities $Q_i$ may be combined to a common channel matrix.

The control unit 11 may evaluate the joint communication quality 36. For example, the joint communication quality 36 may indicate that the set 28 as a whole comprises a sufficiently good communication quality. In such a case, precoding 38 may be implemented, i.e., the satellite 14 may be controlled by the control unit 11 so as to commonly precode the set 28. In the other case in which the joint communication quality indicates that the joint communication quality is below the quality threshold value, the control unit 11 may drop the set 28 and may receive information indicating a different set 28, i.e., a new set. The new set may also be evaluated with respect to the associated joint communication quality of the new set by executing an examination 42 that may be performed in a similar or equal way, e.g., as a further iteration.

According to an embodiment, the set 28 and/or the new set is generated by random. According to an embodiment, the set 28 may be generated by a combination criterion such as a location of the terminal, a fairness criterion or the like. For example, the location may be used in a combination criterion based on the consideration that terminals located close together may face a comparatively similar channel as long as the terminals are not located too close which might cause that they have the almost a same channel represented by a same row in the channel matrix. Similar rows/columns or linear combinations of each other in the channel matrix lead to a high matrix condition number to be avoided. I.e., the distance may be selected based on being at least a minimum distance and being a set of terminals having the closest distance above the minimum distance or having at least a distance being smaller than a maximum distance.

The new set may comprise one or more of the terminals being contained in the set 28. This might cause that a liable terminal that is liable for the joint communication quality 36 exceeding the threshold value to be part of the new set being generated subsequently or later. As it is likely that the liable terminal then causes the new set to be dropped, the control unit 11 may control the satellite 14 so as to schedule the liable terminal with the communication of the second type. Scheduling the liable terminal with the communication of the second type may be initiated at the first time the terminal is identified as a liable terminal or may be initiated after several times a respective terminal was part of a set that was dropped due to the low joint communication quality.

FIG. 3a shows a schematic block diagram of actions that may be performed by the control unit 11 so as to allow for a high system throughput. The control unit 11 may receive information indicating the set 28, for example, by receiving the signal 32. Each of the terminals contained in the set 28, e.g., terminal 1, 4, x-9, x-8 and x-3 from a total of x terminals may face an individual channel to the satellite 14 being represented by a respective channel matrices $H_1$, $H_4$, $H_{X-9}$, $H_{X-8}$, $H_{X-3}$, respectively. The control unit 11 may be configured for determining a joint communication information 44, e.g., a total channel matrix $H_{total}$ being a combination of the individual channel matrices $H_1$ to $H_{x-3}$. E.g., each individual channel matrix $H_1$ to $H_{x-3}$ may form one or more lines or columns of the total channel matrix, i.e., the joint communication information 44.

The control unit 11 may be configured for determining the joint communication quality 36 from the joint communication information 44, e.g., by determining a condition number or a related quantity of it from the total channel matrix $H_{total}$ The condition number may easily be determined from the channel matrix $H_{total}$ that may be required elsewhere in the control unit 11 and thus be available without additional computational effort. I.e., a re-use of the combined channel matrix may be performed.

The joint communication quality 36 may be at least a quality threshold such that the control unit 11 may use the first communication mode 38' as described in connection with the precoding 38 in FIG. 2. When the joint communication quality 36 is below the quality threshold, the control unit 11 identifies a liable terminal during an identification process 46 and subjects the liable terminal to the second communication mode. Subjecting the liable terminal to the second mode may be performed together with the examination 42 of the new set and/or previously or afterwards. I.e., the set 28 is fitted non-uniformly, the liable terminal (isolated or in a group of liable terminals) is/are subjected to the second mode, wherein the non-liable terminals remain in the pool of the plurality of terminals forming the basis for the new sets of terminals.

Figure 3B:
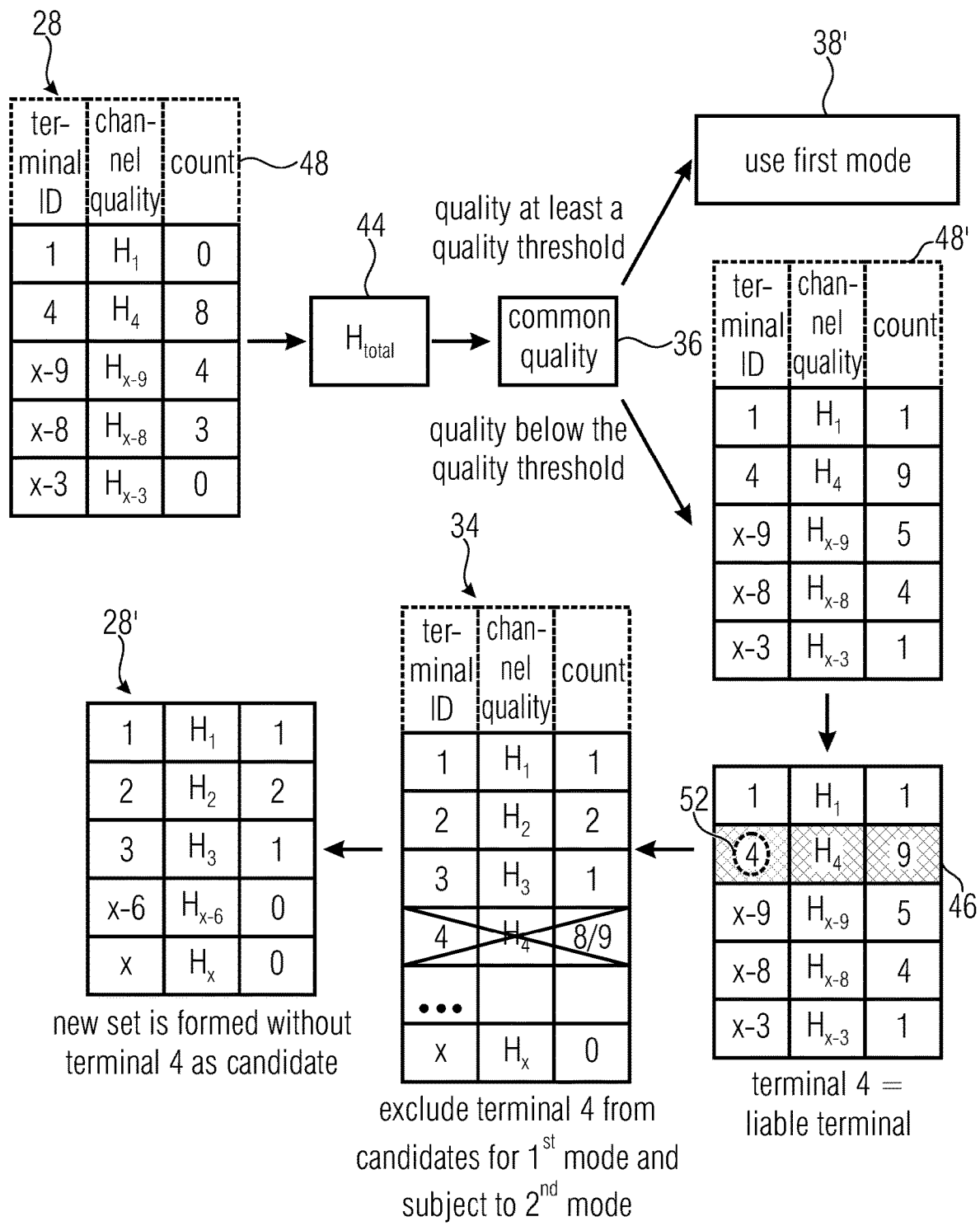
FIG. 3b shows a schematic block diagram of example actions that may be performed by the gateway of the wireless network to identify a liable terminal.

FIG. 3b shows a schematic block diagram of actions that may be performed by the control unit 11. In particular, FIG. 3b illustrates the concept of identifying a liable terminal 52. The set 28 may be represented by a set of terminals in which each terminal is identified by a terminal ID which may be any suitable identifier, e.g., a Medium Access Control (MAC) address, an International Mobile Equipment Identifier (IMEI) or a different value. Each terminal faces a respective channel or communication quality as described in connection with FIG. 3a. Further, the information 32 may indicate a counter 48, wherein the counter 48 may be used to identify the liable terminal 52. In the following, the counter 48 is described as being increased each time a terminal is part of a set that faces a joint communication quality being below the quality threshold. As an equivalent, the counter 48 may also be decreased. Wherein an increase may be evaluated so as to determine that a terminal has reached a maximum count wherein arriving at a specific number, e.g., 2, 4, 5 or 9 or any other number, a decrease may work as an equivalent, e.g., when arriving at 0. I.e., instead of evaluating the communication quality of a respective terminal, a number of times during which the terminal was part of a low-quality set may be evaluated.

The counter 48 may be referred to as a "bad scheduling score", i.e., a score indicating a badness of the terminal in view of its compatibility with other terminals and in view of the communication quality. The bad scheduling score may be used in order to identify the liable terminal. E.g., each counter may indicate how often scheduling of the terminal went wrong (according to the measure). The counter 48 may thus be used as a criterion to identify the liable terminal whose bad scheduling score is above a threshold.

For performing identification 46 described in FIG. 3a, in case the joint communication quality 36 is considered to be below the quality threshold, the count 48 is incremented for each of the terminals being part of the set 28. In the beginning, before the evaluation, terminal 1 has not been part of such a bad set, wherein terminal 4 has been part of a bad set for 8 times, terminal x-9 for a number of 4 times, terminal x-8 for a number of 3 times and terminal x-3 for a number of 0 times. Those values may be represented and associated to the respective terminals by a counter. By increasing the counter 48 of the respective terminals so as to obtain an updated count 48', terminal 1 has a counter 48' of 1, terminal 4 of 9, terminal x-9 of 5, terminal x-8 of 4 and terminal x-3 of 1. I.e., the control unit 11 determines a communication quality parameter based on the joint communication quality and is configured for associating the communication quality parameter with each of the terminals of the set 28 of terminals. Such association may be performed by increasing the counter 48.

The counter 48, 48', respectively, may be referred to as a communication quality parameter. The control unit 11 may be configured for evaluating the communication quality parameter, i.e., the counter 48 or the updated counter 48' of each of the terminals of the set 28 with respect to a communication quality parameter threshold. When increasing the communication quality parameter in case of a bad joint communication quality, the communication quality parameter may be a value of, e.g., 2, 3, 4, 5 or more, 7 or more or any other value such as 9. In case of a decrease, a start-value may be pre-set and in case of arriving at a value of 1 or 0 (or other values), a reach of the communication quality parameter threshold may be given. The control unit 11 may thus evaluate the communication quality parameter 48' of each of the terminals of the set 28 with respect to the communication quality parameter threshold. The control unit 11 may determine the terminal 4 as liable terminal 52 as its communication quality parameter 48' is larger than or equal to the communication quality parameter threshold. Thereby, identification 46 of the terminal 4 as liable terminal 52 may be obtained. The control unit 11 may thus control the satellite 14 so as to schedule communication of the second type to terminal 4 whilst excluding terminal 4 from the plurality 34 of terminals. For example, when scheduling or serving the terminal 4, its request for service may be fulfilled such that terminal 4 is automatically removed from the list of candidates waiting for communication resources.

From the plurality 34, a new set 28' may be formed as a new candidate for a common schedule for communication of the first mode. As terminal 4 is no longer a candidate contained in the plurality 34, it is not a part of the set 28' no matter which criterion for forming the set 28' is used.

Alternatively or in addition, for determining the liable terminal 52 in case of the joint communication quality is below the quality threshold, evaluation of the communication quality parameter 48 may also be performed after having received the signal 32 or before forming the set 28. Evaluating the communication quality parameter directly after having determined a set 28 facing a bad overall quality allows for preventing any further computations that would be necessary when directly removing the liable terminal from the list of candidates.

As described, the control unit 11 may be configured for iteratively determining the joint communication quality 36 for different sets 28, 28' of terminals in different iterations, i.e., for at least one set during an iteration. The control unit 11 may, in each iteration, associate the communication quality parameter to the terminal, by reading, from a memory, a prior communication quality parameter, i.e., the counter 48, already associated with the terminal. The control unit 11 may combine the prior communication quality parameter (counter 48) with the communication quality parameter determined in the present iteration (increment/decrement) so as to obtain an updated communication quality parameter (counter 48') and to associate the updated communication quality parameter with the terminal by storing the updated communication quality parameter in the memory. I.e., the control unit 11 stores the counter 48' either by reporting it to an entity that provides for the signal 32 or by storing it in an own memory. The control unit 11 may be configured for determining the liable terminal using the updated communication quality parameter.

Figure 3C:
FIG. 3c shows a schematic block diagram of example actions performed by the gateway of the wireless network of FIG. 1 according to an embodiment in a case where a set of terminals is considered to have a joint communication quality being at least a quality threshold.
Figure 3C:

FIG. 3c shows a schematic block diagram of actions performed by the control unit 11 according to an embodiment in a case where the set 28' is considered to have a joint communication quality being at least the quality threshold. In such a case, the control unit 11 may control communication by controlling the gateway-side transmitters and/or the satellite 14 so as to schedule the set 28' with communication of the first type according to a schedule $54_1$. I.e., the satellite 14 is controlled so as to handle the set 28' set-wise. I.e., the communication is controlled by controlling the respective transmitters. The liable terminal 52 is subjected to a schedule $54_2$ so as to being served with a communication of the second type such as an un-precoded communication.

Figure 4:
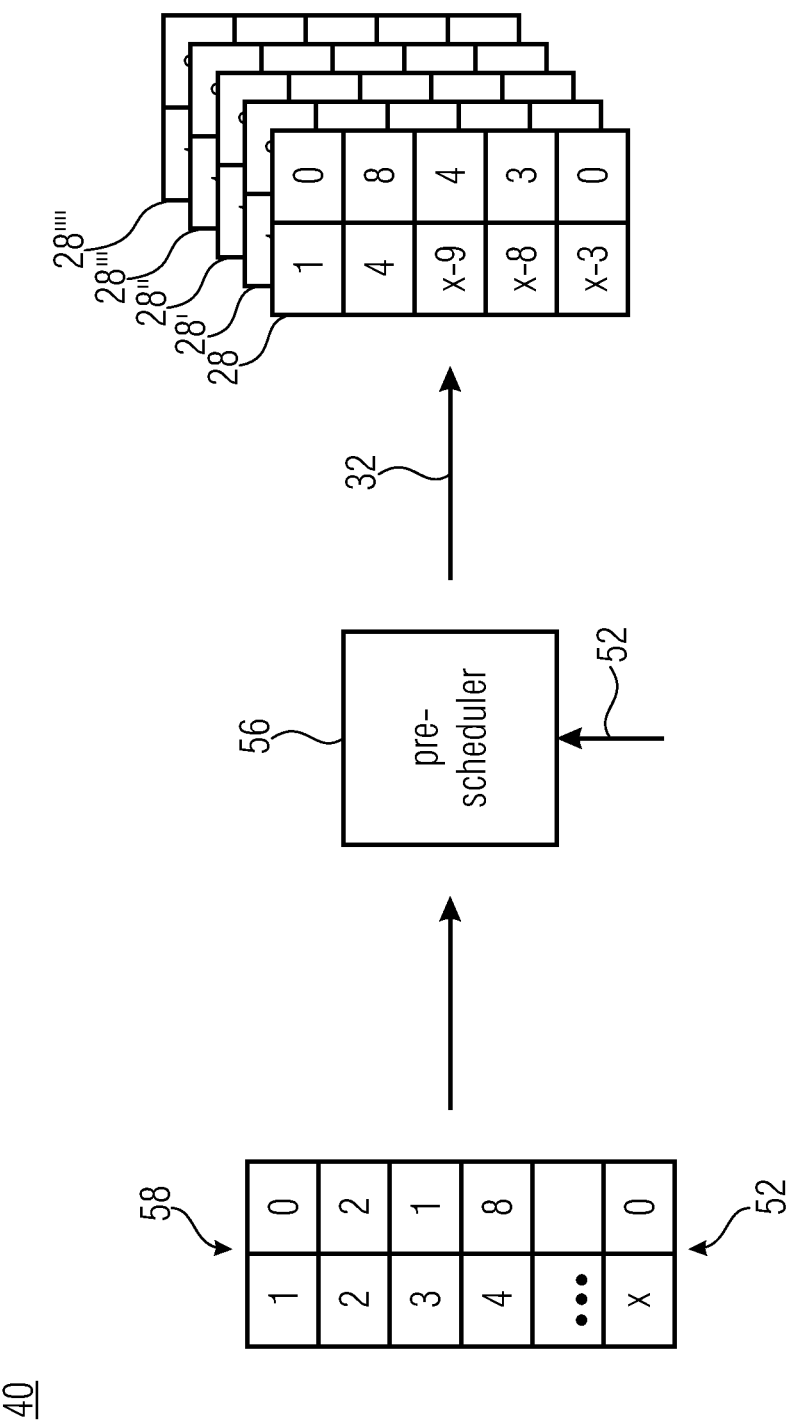
FIG. 4 shows a schematic block diagram of a part of a gateway according to an embodiment, comprising a pre-scheduler.

FIG. 4 shows a schematic block diagram of a part of a control unit 40 according to an embodiment, wherein the control unit 40 comprises a pre-scheduler 46 configured for providing information 32 indicating a plurality of sets 28, 28', 28'', 28''' and/or 28''''. The control unit 40 may be used at, in or in connection with the gateway 10 and/or the satellite 14. The pre-scheduler may be configured for generating the sets based on a combination criterion such as considering a location information and/or a fairness criterion and/or may generate the sets by random. The pre-scheduler 56 may have access to a memory 58 having stored thereon the terminals being a candidate for communication. The pre-scheduler 56 may receive information indicating the liable terminal 52 and may exclude the liable terminal 52 from being part of a set indicated by the information 32. Alternatively or in addition, the liable terminal 52 may be incorporated into the memory 58 by removing the liable terminal 52 from the set of candidates and/or marking the liable terminal 52, e.g., by including information like "foreseen for second type communication". Both configurations allow the pre-scheduler so as to exclude the liable terminal from further sets being generated or formed. In particular, the control unit 40 having rejected a first set of terminals from being scheduled with the communication of the first type when the joint communication quality is below the quality threshold value may thus restrict further considerations to non-liable terminals. Each of the sets 28, 28', 28'', 28''' and/or 28'''' may be regarded as a proposal formed by the control unit 40 or by the external node, indicating that the communication of the first type is proposed to be scheduled commonly to the terminals of the respective set.

Further functionality of the control unit 40 may be in accordance with the description made in connection with the control unit 11.

Figure 5:
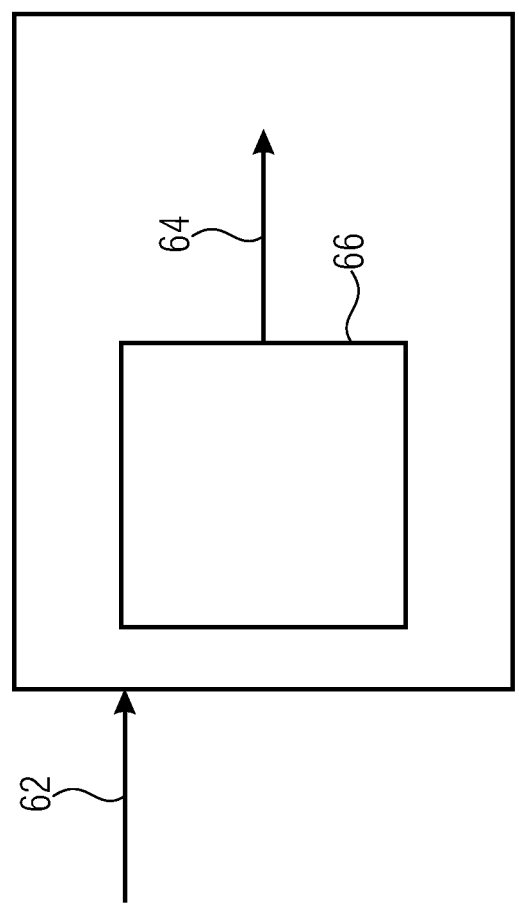
FIG. 5 shows a schematic block diagram of at least a part of a gateway according to an embodiment, that may be formed in accordance with the functionality described in connection with the gateway of FIG. 1 and/or FIG. 4 and being configured for receiving a location information.

FIG. 5 shows a schematic block diagram of at least a part of a control unit 50 that may be formed in accordance with the functionality described in connection with the control unit 11 and/or 40. Further, the control unit 50 may be configured for receiving a location information 62. The location information 62 may be received from a respective terminal $12_1$ to $12_5$ and/or for a different node having respective information. The location information 62 may indicate a location of the respective terminal, wherein the location information may comprise, for example, an information indicating a position within a respective positioning system such as the global positioning system (GPS) Galileo or Glonass. Alternatively, a location ID indicating a respective area in which the terminal is located or the like may be transmitted.

The LoS path may allow that terminals, although being arranged with large distance therebetween, face a same or similar channel. Thus, it may be sufficient to know a terminal's position within uncertainties of several hundred meters or even kilometers to at least approximately know their channel quality, the similarity thereof respectively. The control unit 50 is configured for forming the set 28 of terminals based on a channel state information or communication quality information 64, the information 64 indicating the communication quality between terminals and a satellite. The information 64 may thus comprise a channel state information (CSI) and/or a channel matrix H. The control unit 50 may comprise a determiner 66 configured for approximating the information 64, i.e., the CSI or the matrix H from the location information 62. For example, a respective reference information may be stored in a memory. A terminal being arranged close to such a reference terminal may be considered to have a same or at least similar channel state or communication quality. Further, the determiner 66 may be configured for interpolating the location information, i.e., the location information 62 indicating a position between two reference terminals may be approximated by the determiner 66 as a value between a respective value of the reference terminals. This allows preventing a transmission of the respective channel state information/communication quality from the terminal back to a centralized node, the respective embodied control unit and/or the gateway 10. A location information may either be known or may be transmitted with a low load for the resources and may thus allow for a high system throughput.

Figure 6:
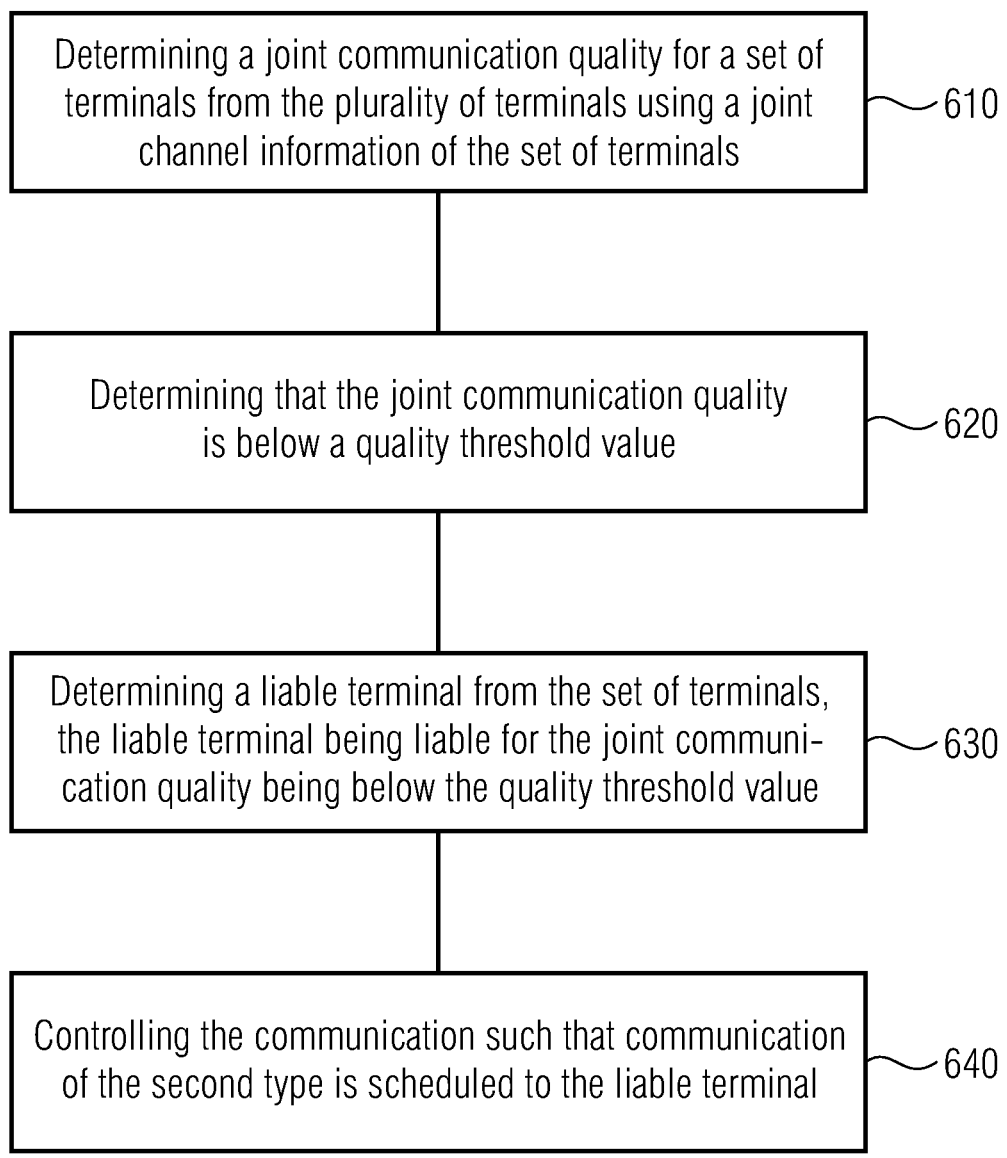
FIG. 6 shows a schematic flowchart of a method for operating a gateway according to an embodiment.

FIG. 6 shows a schematic flowchart of a method 600 according to an embodiment. The method 600 may be used for operating a control unit such as the control unit 11, 40 and/or 50. The method 600 comprises a step 610 comprising determining a joint communication quality for a set of terminals from the plurality of terminals using a joint communication information of the set of terminals, e.g., the channel matrix $H_{total}$. A step 620 comprises determining that the joint communication quality is below a quality threshold value, e.g., by evaluating a condition number of the channel matrix $H_{total}$ or a related quantity of it. A step 630 comprises determining a liable terminal from the set of terminals, the liable terminal being liable for the joint communication quality being below the quality threshold value. A step 640 comprises controlling the communication such that communication of the second type is scheduled to the liable terminal.

In other words, one aspect of the present invention is to use the user's channel information in order to derive the channel matrices corresponding to the set of users first randomly chosen. Looking at the condition of the matrix (orthogonality property), the control unit/gateway may decide if the present set of users is well-suited with the use of precoding or not. The channel matrix condition is used as criteria to judge the user's scheduling quality. From this information can therefore the users be re-scheduled to new sets or not and the user's scheduling accepted, rejected or optimized.

The channel information of the users is inverted by the pre-coder to be able to pre-process the signals in order to pre-compensate the channel and therefore handle interference between the beams. (Numerically) Inverting a matrix can be complicated depending on the matrix properties and mainly its condition number. A low condition number ensures a more successful and efficient pre-coding. Therefore, the users can be scheduled together in order to obtain channel matrices with the lowest condition number or a condition number lower than a defined threshold. If the criteria are not fulfilled, then the scheduling will be selected for a different set of users.

Figure 7:
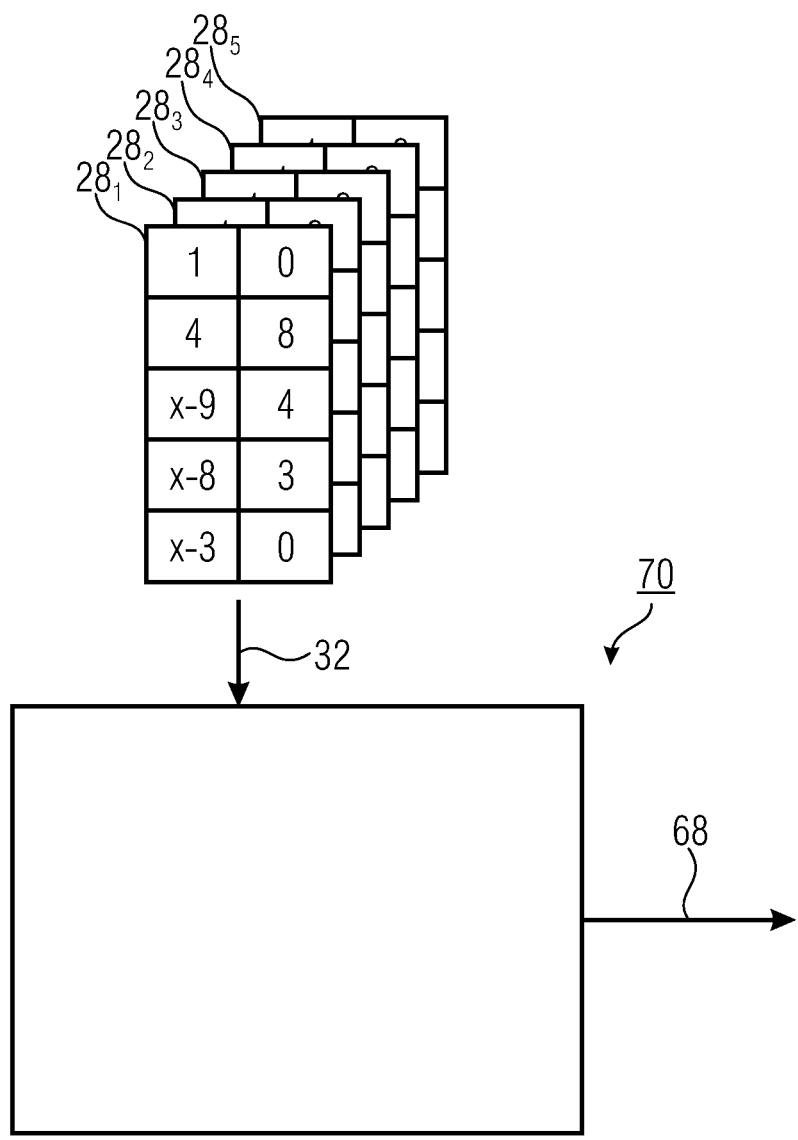
FIG. 7 shows a schematic block diagram of a gateway according to an embodiment, wherein the gateway is configured for selecting a set of terminals based on their joint communication quality.

FIG. 7 shows a schematic block diagram of a control unit 70 according to an embodiment. The control unit 70 is configured to control communication performed by use of the satellite 14 as described in connection with FIG. 1. The control unit 70 is configured to control a communication between the satellite and the plurality of terminals $12_1$ to $12_5$. The control unit 70 is configured for controlling the satellite 14 so as to schedule a set-wise communication, e.g., the communication of the first type, for a set of terminals. The control unit 70 is further configured for obtaining information indicating a plurality of sets $28_1$ to $28_5$ of terminals, each set of terminals being a subset of the plurality of terminals. For example, the sets $28_1$ to $28_5$ may be a possible or suitable combination of terminals from the plurality of terminals. According to one embodiment, the terminals may be grouped by random such that the plurality of sets may embody every possible combination of a respective number of terminals, wherein the number of terminals of a set may be equal or different between different sets and may be, at least 2, at least 3, at least 4, at least 5, at least 10 or a higher number. This may depend e.g. on the number of available beams. For unicast precoding, where each terminal will be served by a precoded data frame, the number of terminals is less or maximum equal to the number of beams. So, at maximum there is one terminal per beam. If less terminals are in a set than the number of involved beams, the quality and robustness of the link is improved. However, for multicast precoding, where terminals being very close to each other and having therefore the same channel can share precoded data frames, also more terminals than the number of beams can form a set. This works because the terminals with the same channel conditions are considered as one virtual terminal for the precoding.

The control unit 70 may be configured for associating a joint communication quality such as the condition number for each set of terminals. For example, the different sets $28_1$ to $28_5$ may be processed as described in connection with the control unit 11, 40 or 50. Alternatively or in addition to reject the liable terminal, the control unit 70 may be configured for determining a highest communication quality, e.g., the lowest condition number, amongst the different sets $28_1$ to $28_5$. Accordingly, the control unit 70 may control the communication the selected set of terminals is scheduled with the communication, i.e., the set comprising the highest communication quality and/or further sets being above a respective threshold indicating a quality being good enough is selected. This may be performed alternatively or in addition with the functionality of the control unit 11, 40 and 50, i.e., the control unit 70 may be configured for determining that the joint communication quality of a respective set is below a quality threshold value, determining a liable terminal from the determined set of terminals, the liable terminal being liable for the joint communication quality being below the quality threshold value, and controlling the satellite so as to schedule communication of a different type to the liable terminal, e.g., the second type. Alternatively or in addition, the control unit 11, 40 and/or 50 may be configured for evaluating a plurality of sets as described in connection with the control unit 70.

An indicator signal 68 provided by the control unit 70 may indicate the selected set $28_1$, $28_2$, $28_3$, $28_4$ or $28_5$ and may be transmitted to the satellite 14.

Figure 8:
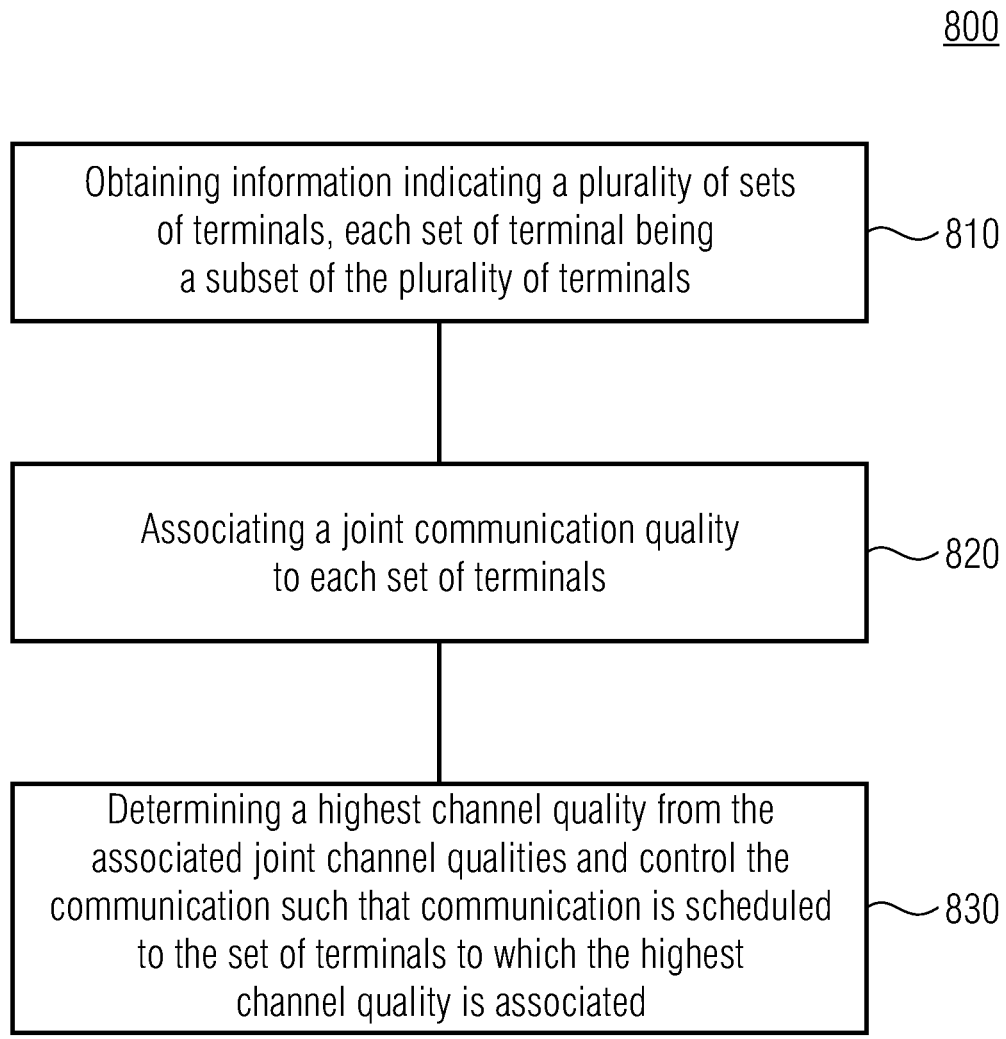
FIG. 8 shows a schematic flowchart of a method for operating a gateway for selecting a set of terminals based on their joint communication quality.

FIG. 8 shows a schematic flowchart of a method 800 comprising a step 810 in which information indicating a plurality of sets of terminals is obtained, each set of terminals being a subset of the plurality of terminals. A step 820 comprises associating a joint communication quality to each set of terminals. A step 830 comprises determining a highest communication quality from the associated joint communication qualities and control the communication such that the set of terminals is scheduled with the communication, wherein the set is selected to which the highest communication quality is associated. This may include determining a plurality of sets having a communication quality of at least the threshold value.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] B. Hamet, C. Rohde, P. Bhave, A. Liddell, "Over-the-air field trials of linear precoding for multi-spot-beam satellite systems", 34th AIAA International Communications Satellite Systems Conference (ICSSC), October 2016

[2] Draft ETSI EN 302 307-2 V1.1.1 (2014-10), Digital Video Broadcasting (DVB);

Second generation framing structure, channel coding and modulation systems ( . . . ); Part 2: DVB-S2 Extension (DVB-S2X).

The invention claimed is:

1. A control unit configured to control a communication between a satellite and a plurality of terminals, such that communication is scheduled to a terminal, the communication being one of at least a set-wise first type having a common pre-coding for a set of terminals and a second type, wherein the control unit is configured for:
 determining a joint communication quality for a set of terminals from the plurality of terminals using a joint communication information of the set of terminals;
 determining that the joint communication quality is below a quality threshold value;
 determining a liable terminal from the set of terminals, the liable terminal being liable for the joint communication quality being below the quality threshold value; and
 controlling the communication such that communication of the second type is scheduled to the liable terminal.

2. The control unit according to claim 1, wherein the set is a proposal indicating that the communication of the first type is proposed to be scheduled jointly to the set of terminals.

3. The control unit according to claim 1, wherein the set is received from a pre-scheduler configured for generating the set of terminals as subset of the plurality of terminals using a combination criterion or by random.

4. The control unit according to claim 1, wherein, for determining the liable terminal, the control unit is configured for:
 determining a communication quality parameter based on the joint communication quality and associating the communication quality parameter with each of the terminals of the set of terminals, for which the control unit determines that the joint communication quality is below the quality threshold value; or
 evaluating the communication quality parameter of each of the terminals of the set with respect to a communication quality parameter threshold and to determine a terminal as liable terminal when the communication quality parameter is larger than or equal to the communication quality parameter threshold.

5. The control unit according to claim 4, wherein the communication quality parameter associated to a terminal is a counter, wherein the control unit is configured for incrementing or decrementing the counter each time the terminal is part of a set for which the control unit determines that the joint communication quality is below the quality threshold value, wherein the control unit is further configured for determining the terminal as liable terminal when the counter has reached a predefined value.

6. The control unit according to claim 4, wherein the control unit is configured for iteratively determining the joint communication quality for different sets of terminals in different iterations, wherein the control unit is configured for, in each iteration:
 associating the communication quality parameter to the terminal by reading, from a memory a prior communication quality parameter already associated with the terminal and to combine the prior communication quality parameter with the communication quality parameter determined in the present iteration so as to obtain an updated communication quality parameter and to associate the updated communication quality parameter with the terminal by storing the updated communication quality parameter in the memory;
 wherein the control unit is configured for determining the liable terminal using the updated communication quality parameter.

7. The control unit according to claim 1, wherein the joint communication information is a channel matrix formed for the set of terminals.

8. The control unit according to claim 7, wherein the control unit is configured for determining the joint communication quality based on a condition number of the channel matrix.

9. The control unit according to claim 1, wherein the control unit is configured for rejecting the set of terminals from being scheduled with the communication of the first type when the joint communication quality is below a quality threshold value and to exclude the liable terminal from the set of terminals; wherein the control unit comprises a pre-scheduler configured for including the remaining terminals into at least one further set of terminals and to provide the further set of terminals as further proposal.

10. The control unit according to claim 1, wherein the control unit is configured for controlling the communication such that the set of terminals is scheduled jointly to a jointly precoded communication in the first type of communication and such that the liable terminal is scheduled to an unprecoded communication.

11. The control unit according to claim 1, wherein the control unit is configured for forming the set of terminals based on a channel state information of a channel between the satellite and a terminal of the set of terminals, wherein the control unit is configured for approximating the channel state information based on a location related information being related to a position of the terminal.

12. The control unit according to claim 1, wherein the control unit is configured for:
obtaining a plurality of sets of terminals, each set of terminals being a subset of the plurality of terminals;
associating a joint communication quality to each set of terminals;
determining a highest communication quality from the associated joint communication qualities and control the satellite so as to schedule the set of terminals with the communication to which the highest communication quality is associated.

13. The control unit according to claim 1, wherein the control unit is located at least partially as part of the satellite or at least partially as part of a gateway.

14. A control unit configured to control a communication between a satellite and a plurality of terminals, wherein the control unit is configured for controlling the communication such that a set-wise communication having a common pre-coding is scheduled for a set of terminals, wherein the control unit is configured for:
obtaining information indicating a plurality of sets of terminals, each set of terminals being a subset of the plurality of terminals;
associating a joint communication quality to each set of terminals;
determining a highest communication quality from the associated joint communication qualities and control the communication such that the set of terminals is scheduled with the communication to which the highest communication quality is associated;
determining that the joint communication quality of a set is below a quality threshold value;
determining a liable terminal from the determined set of terminals, the liable terminal being liable for the joint communication quality being below the quality threshold value; and
controlling the communication such that communication of a different type is scheduled to the liable terminal.

15. The control unit according to claim 14, wherein the control unit is located at least partially as part of the satellite or at least partially as part of a gateway.

16. A satellite comprising a control unit configured to control a communication between a satellite and a plurality of terminals, such that communication is scheduled to a terminal, the communication being one of at least a set-wise first type having a common pre-coding for a set of terminals and a second type, wherein the control unit is configured for:
determining a joint communication quality for a set of terminals from the plurality of terminals using a joint communication information of the set of terminals;
determining that the joint communication quality is below a quality threshold value;
determining a liable terminal from the set of terminals, the liable terminal being liable for the joint communication quality being below the quality threshold value; and
controlling the communication such that communication of the second type is scheduled to the liable terminal; and
a control unit configured to control a communication between a satellite and a plurality of terminals, wherein the control unit is configured for controlling the communication such that a set-wise communication having a common pre-coding is scheduled for a set of terminals, wherein the control unit is configured for:
obtaining information indicating a plurality of sets of terminals, each set of terminals being a subset of the plurality of terminals;
associating a joint communication quality to each set of terminals;
determining a highest communication quality from the associated joint communication qualities and control the communication such that the set of terminals is scheduled with the communication to which the highest communication quality is associated.

17. A gateway comprising a control unit configured to control a communication between a satellite and a plurality of terminals, such that communication is scheduled to a terminal, the communication being one of at least a set-wise first type having a common pre-coding for a set of terminals and a second type, wherein the control unit is configured for:
determining a joint communication quality for a set of terminals from the plurality of terminals using a joint communication information of the set of terminals;
determining that the joint communication quality is below a quality threshold value;
determining a liable terminal from the set of terminals, the liable terminal being liable for the joint communication quality being below the quality threshold value; and
controlling the communication such that communication of the second type is scheduled to the liable terminal; and
a control unit configured to control a communication between a satellite and a plurality of terminals, wherein the control unit is configured for controlling the communication such that a set-wise communication having a common pre-coding is scheduled for a set of terminals, wherein the control unit is configured for:
obtaining information indicating a plurality of sets of terminals, each set of terminals being a subset of the plurality of terminals;
associating a joint communication quality to each set of terminals;
determining a highest communication quality from the associated joint communication qualities and control the communication such that the set of terminals is scheduled with the communication to which the highest communication quality is associated.

18. A wireless communication network comprising:
a plurality of terminals;
a control unit configured to control a communication between a satellite and a plurality of terminals, such that communication is scheduled to a terminal, the communication being one of at least a set-wise first type having a common pre-coding for a set of terminals and a second type, wherein the control unit is configured for:
  determining a joint communication quality for a set of terminals from the plurality of terminals using a joint communication information of the set of terminals;
  determining that the joint communication quality is below a quality threshold value;
  determining a liable terminal from the set of terminals, the liable terminal being liable for the joint communication quality being below the quality threshold value; and
  controlling the communication such that communication of the second type is scheduled to the liable terminal;
a control unit configured to control a communication between a satellite and a plurality of terminals, wherein the control unit is configured for controlling the communication such that a set-wise communication having a common pre-coding is scheduled for a set of terminals, wherein the control unit is configured for:
  obtaining information indicating a plurality of sets of terminals, each set of terminals being a subset of the plurality of terminals;
  associating a joint communication quality to each set of terminals;
  determining a highest communication quality from the associated joint communication qualities and control the communication such that the set of terminals is scheduled with the communication to which the highest communication quality is associated; and
at least one satellite operated by a gateway.

19. Method for operating a control unit configured to control a communication between a satellite and a plurality of terminals, wherein the control unit is configured for controlling the communication such that communication is scheduled to a terminal, the communication being one of at least a set-wise first type having a common pre-coding for a set of terminals and a second type, wherein the method comprises:
  determining a joint communication quality for a set of terminals from the plurality of terminals using a joint communication information of the set of terminals;
  determining that the joint communication quality is below a quality threshold value;
  determining a liable terminal from the set of terminals, the liable terminal being liable for the joint communication quality being below the quality threshold value; and
  controlling the satellite so as to schedule communication of the second type to the liable terminal.

20. Method for operating a control unit configured to control a communication between a satellite and a plurality of terminals, wherein the control unit is configured for controlling the communication such that a set-wise communication is scheduled for a set of terminals, wherein the method comprises:
  obtaining information indicating a plurality of sets of terminals, each set of terminals being a subset of the plurality of terminals;
  associating a joint communication quality for each set of terminals; and
  determining a highest communication quality from the associated joint communication qualities and control the communication such that the set of terminals is scheduled with the set-wise communication to which the highest communication quality is associated;
  determining that the joint communication quality of a set is below a quality threshold value;
  determining a liable terminal from the determined set of terminals, the liable terminal being liable for the join communication quality being below the quality threshold value; and
  controlling the communication such that communication of a different type is scheduled to the liable terminal.

21. A non-transitory digital storage medium having a computer program stored thereon to perform the method for operating a control unit configured to control a communication between a satellite and a plurality of terminals, wherein the control unit is configured for controlling the communication such that communication is scheduled to a terminal, the communication being one of at least a set-wise first type having a common pre-coding for a set of terminals and a second type, wherein the method comprises:
  determining a joint communication quality for a set of terminals from the plurality of terminals using a joint communication information of the set of terminals;
  determining that the joint communication quality is below a quality threshold value;
  determining a liable terminal from the set of terminals, the liable terminal being liable for the joint communication quality being below the quality threshold value; and
  controlling the satellite so as to schedule communication of the second type to the liable terminal,
when said computer program is run by a computer.

22. A non-transitory digital storage medium having a computer program stored thereon to perform the method for operating a control unit configured to control a communication between a satellite and a plurality of terminals, wherein the control unit is configured for controlling the communication such that a set-wise communication is scheduled for a set of terminals, wherein the method comprises:
  obtaining information indicating a plurality of sets of terminals, each set of terminals being a subset of the plurality of terminals;
  associating a joint communication quality for each set of terminals; and
  determining a highest communication quality from the associated joint communication qualities and control the communication such that the set of terminals is scheduled with the set-wise communication to which the highest communication quality is associated;
  determining that the joint communication quality of a set is below a quality threshold value;
  determining a liable terminal from the determined set of terminals, the liable terminal being liable for the joint communication quality being below the quality threshold value; and
  controlling the communication such that communication of a different type is scheduled to the liable terminal,
when said computer program is run by a computer.

* * * * *